(12) United States Patent
Purushothaman et al.

(10) Patent No.: US 11,055,196 B1
(45) Date of Patent: Jul. 6, 2021

(54) SYSTEM AND METHOD FOR OPTIMIZING TECHNOLOGY STACK ARCHITECTURE

(71) Applicant: Bank of America Corporation, Charlotte, NC (US)

(72) Inventors: Sasidhar Purushothaman, Hyderabad (IN); Pragyan Paramita Hembram, Hyderabad (IN); Srikanth Vemula, Hyderabad (IN); Srinivas Darga, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/900,547

(22) Filed: Jun. 12, 2020

(51) Int. Cl.
 *G06F 9/44* (2018.01)
 *G06F 11/34* (2006.01)
 *G06F 9/50* (2006.01)
 *G06N 5/00* (2006.01)

(52) U.S. Cl.
 CPC .......... *G06F 11/3457* (2013.01); *G06F 9/505* (2013.01); *G06F 11/3409* (2013.01); *G06N 5/003* (2013.01); *G06F 2201/81* (2013.01)

(58) Field of Classification Search
 CPC .................................................. G06F 11/3457
 USPC ......................................................... 703/21
 See application file for complete search history.

(56) References Cited

U.S. PATENT DOCUMENTS

| | | | |
|---|---|---|---|
| 5,938,732 A | 8/1999 | Lim et al. | |
| 6,031,984 A | 2/2000 | Walser | |
| 6,078,960 A | 6/2000 | Ballard | |
| 6,185,619 B1 | 2/2001 | Joffe et al. | |
| 6,249,801 B1 | 6/2001 | Zisapel et al. | |
| 6,256,773 B1 | 7/2001 | Bowman-Amuah | |
| 6,260,065 B1 | 7/2001 | Leiba et al. | |
| 6,341,303 B1 | 1/2002 | Rhee et al. | |
| 6,389,448 B1 | 5/2002 | Primak et al. | |
| 6,658,473 B1 | 12/2003 | Block et al. | |
| 6,671,259 B1 | 12/2003 | He et al. | |
| 7,058,947 B1 | 6/2006 | Raja et al. | |
| 7,246,256 B2 | 7/2007 | De La Cruz et al. | |
| 7,305,379 B2 | 12/2007 | Goyal et al. | |
| 7,752,624 B2 | 7/2010 | Crawford, Jr. et al. | |
| 8,121,996 B2 | 2/2012 | Andreev et al. | |
| 8,301,718 B2 | 10/2012 | Macken | |
| 8,386,607 B2 | 2/2013 | Hu et al. | |

(Continued)

*Primary Examiner* — Timothy A Mudrick

(74) *Attorney, Agent, or Firm* — Michael A. Springs

(57) ABSTRACT

A system is configured for determining a technology stack in a software application to perform a work project. The system receives the work project from a user. The work project is evaluated based on its characteristics. A plurality of technology stacks is generated by implementing different combinations of technology stack components. The technology stack components include application servers and webservers. Each of the technology stacks is simulated performing the work project. Based on the simulation results of each technology stack, a performance value corresponding to a success rate of performing the work project by the software application. The system identifies a first technology stack having a first performance value that is the highest performance value and above a performance threshold value. The system deploys the first technology stack in the software application to perform the work project.

20 Claims, 3 Drawing Sheets

(56) References Cited

U.S. PATENT DOCUMENTS

| | | | |
|---|---|---|---|
| 8,468,241 B1 * | 6/2013 | Raizen | G06F 11/3055 709/224 |
| 8,676,622 B1 | 3/2014 | Ward, Jr. et al. | |
| 9,009,213 B2 | 4/2015 | Jugel | |
| 9,191,380 B2 | 11/2015 | Anderson et al. | |
| 9,195,506 B2 | 11/2015 | Bird et al. | |
| 9,240,933 B2 | 1/2016 | Cheung et al. | |
| 9,336,060 B2 | 5/2016 | Nori et al. | |
| 9,384,051 B1 | 7/2016 | Chopra et al. | |
| 9,426,155 B2 | 8/2016 | Chao et al. | |
| 9,513,967 B2 | 12/2016 | Dube et al. | |
| 9,967,159 B2 | 5/2018 | Shroff et al. | |
| 9,973,425 B2 | 5/2018 | Makhervaks et al. | |
| 10,042,673 B1 * | 8/2018 | Espy | G06F 9/505 |
| 10,585,714 B2 | 3/2020 | Aronovich | |
| 10,657,459 B2 | 5/2020 | Hack et al. | |
| 2001/0049741 A1 | 12/2001 | Skene et al. | |
| 2002/0120787 A1 | 8/2002 | Shapiro et al. | |
| 2002/0194335 A1 | 12/2002 | Maynard | |
| 2004/0181794 A1 | 9/2004 | Coleman et al. | |
| 2006/0064691 A1 | 3/2006 | Blaisdell et al. | |
| 2008/0282253 A1 | 11/2008 | Huizenga | |
| 2009/0216863 A1 * | 8/2009 | Gebhart | G06Q 10/063 709/220 |
| 2010/0251258 A1 | 9/2010 | Hanamori et al. | |
| 2011/0247002 A1 | 10/2011 | Salapura et al. | |
| 2012/0185868 A1 | 7/2012 | Bartfai-Walcott et al. | |
| 2012/0221521 A1 | 8/2012 | Chiu et al. | |
| 2012/0227049 A1 | 9/2012 | Longobardi et al. | |
| 2012/0297067 A1 | 11/2012 | Arrowood et al. | |
| 2013/0007753 A1 | 1/2013 | Jain | |
| 2013/0074090 A1 | 3/2013 | Kumar et al. | |
| 2013/0226985 A1 | 8/2013 | Dixon et al. | |
| 2015/0149636 A1 | 5/2015 | Shazly et al. | |
| 2016/0359683 A1 | 12/2016 | Bartfai-Walcott et al. | |
| 2018/0176830 A1 | 6/2018 | Yang et al. | |
| 2019/0044945 A1 | 2/2019 | Kundu et al. | |
| 2020/0090056 A1 * | 3/2020 | Singhal | G06N 5/04 |

* cited by examiner

SYSTEM AND METHOD FOR OPTIMIZING TECHNOLOGY STACK ARCHITECTURE

TECHNICAL FIELD

The present disclosure relates generally to optimizing technology stacks, and more specifically to a system and method for optimizing technology stack architecture.

BACKGROUND

In any organization, software architectures support activities related to the organization (e.g., services to clients). Existing software architectures are statically designed for a specific work project. Thus, the existing software architectures are unreliable and unpredictable when performing different work projects.

SUMMARY

In one embodiment, a system for determining a technology stack to perform a work project in a software application includes a processor configured to receive the workload (e.g., from a user via a user interface of a computing device). The processor evaluates the work project based at least in part upon a set of characteristics of the work project including a software application performance and a webserver performance. The processor generates a plurality of technology stacks by implementing different combinations of technology stack components. The technology stack components comprise application servers and webservers. The plurality of technology stacks includes a first technology stack and a second technology stack. The first technology stack comprises a first application server and a first web server. The second technology stack comprises a second application server and a second webserver. The processor simulates each technology stack performing the work project. Based on the simulation results of each technology stack, the processor determines a performance value corresponding to a success rate of performing the work project by the software application. The processor identifies a first technology stack having the highest performance value from among the plurality of technology stacks and above a performance threshold value set by the user. The processor deploys the first technology stack in the software application to perform the work project.

Technology stack architectures are becoming increasingly important and difficult to implement as the number of software applications to support all activities of an organization increases and each of those software applications need to seamlessly work together to provide different services to users. The existing technology stack architectures lack capabilities to dynamically adapt to perform different work projects in different scenarios.

Certain embodiments of this disclosure provide unique solutions to technical problems of the existing technology stack architectures for performing different work projects in different scenarios. For example, the disclosed system provides several technical advantages which include 1) generating a more optimal technology stack having the highest performance from among a plurality of technology stacks that is able to perform work projects under different scenarios; 2) dynamically adapting a deployed technology stack to enable the software application to perform different work projects in different scenarios; 3) implementing new application servers and webservers in the deployed technology stack; and 4) seamlessly replacing the deployed technology stack with another technology stack as operating conditions warrant. As such, this disclosure may improve the function of the existing technology stack architectures and consequently improve the function of the underlying computer systems in which the existing technology stack architectures are deployed. For example, the disclosed system may prevent a software application from crashing when a large number of clients of the organization (e.g., 100,000 clients) attempt to use the software application in a small time period (e.g., one minute). In another example, the disclosed system may prevent the software application from crashing when a large number of clients of the organization (e.g., 100,000 clients) attempt to use the software application over an extended time period (e.g., 24 hours).

Accordingly, the system described herein provides a practical application of dynamically generating a more optimal technology stack capable of performing different work projects with different scenarios. This, in turn, provides the additional practical application of improving the function of the underlying computer system to perform the different work projects in different scenarios successfully. Accordingly, the described system improves the operation of the underlying computing device by preventing a software application operating on that computer system from crashing in situations where such a crash would otherwise occur if the software application was unable to adapt to different work projects in different scenarios.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Components

Figure 1:
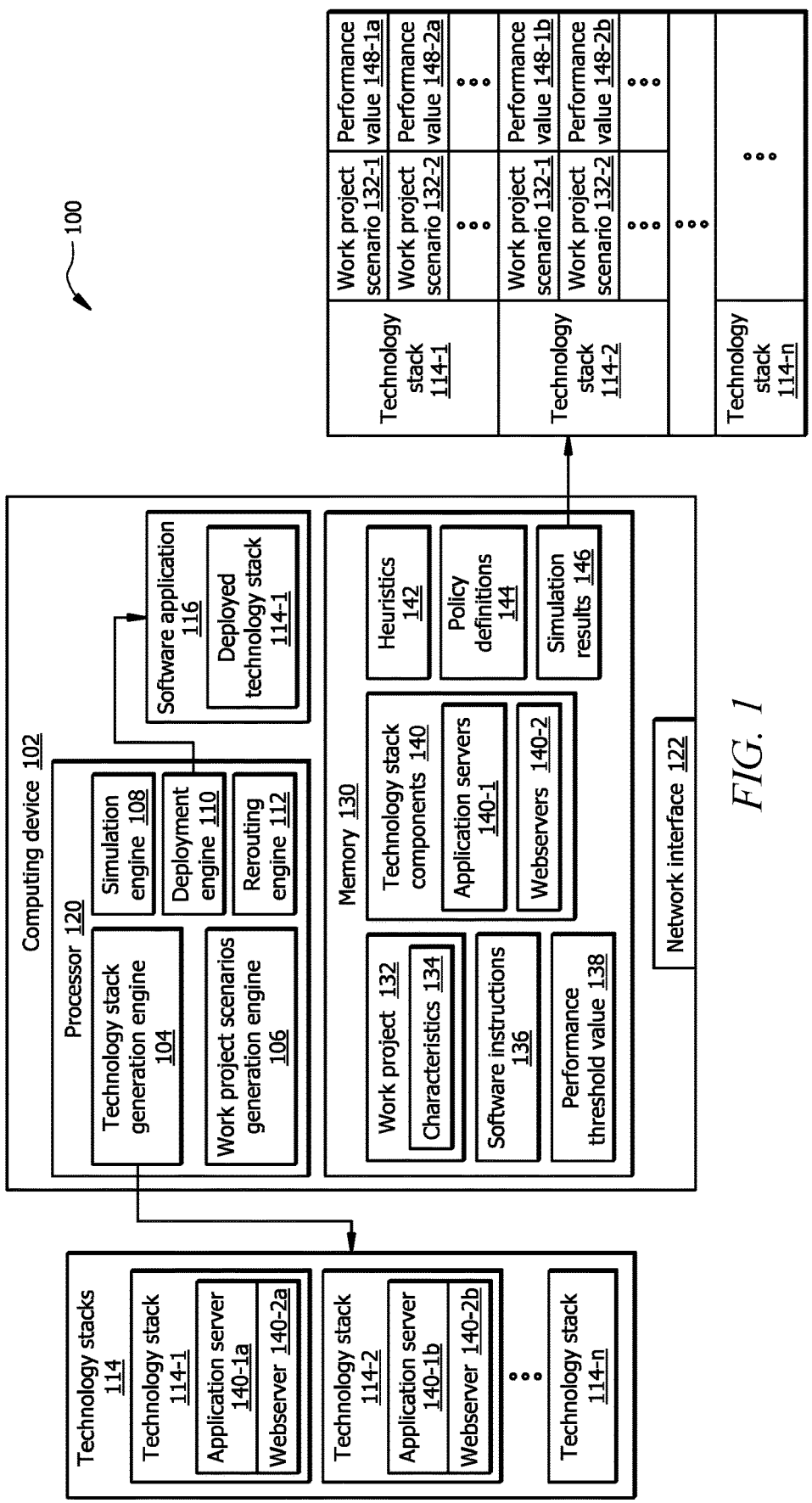
FIG. 1 illustrates one embodiment of a system configured to determine a technology stack to be deployed on a software application.

FIG. 1 illustrates one embodiment of a system 100 configured to determine a technology stack 114 to be deployed on a software application 116 to perform a work project 132. In one embodiment, the system 100 comprises a computing device 102 that includes processor 120 in signal communication with a network interface 122 and a memory 130. Memory 130 includes one or more program modules (e.g., software instructions 136) having instructions that when executed by the processor 120 cause the computing device 102 to perform one or more functions described herein. Memory 130 may also include one or more databases (e.g., technology stack components 140, heuristics 142, etc.) that may store and/or otherwise maintain information which may be used by such program modules and/or processor 120. In one embodiment, the processor 120 includes a technology stack generation engine 104, a work project scenarios generation engine 106, a simulation engine 108, a deployment engine 110, and a rerouting engine 112. In other embodiments, system 100 may not have all of the components listed and/or may have other elements instead of, or in addition to, those listed above.

In general, system 100 prevents the software application 116 from crashing by generating a more optimal technology stack 114 capable of performing the work project 132 with a performance value 148 higher than other technology stacks 114. The system 100 also deploys the more optimal technology stack 114 in the software application 116. The system 100 also dynamically adapts the more optimal technology stack 114 deployed in the software application 116 to perform different work projects 132 in different scenarios. Therefore, the system 100 improves the technology stack architecture technologies.

Computing device 102 is generally any device configured to perform specific functions and interact with users. Examples of the computing device 102 may include but not limited to a personal computer, a desktop computer, a workstation, a server, a laptop, a tablet computer, a mobile phone (such as smartphones), etc. For example, the computing device 102 may be a server of an organization configured to maintain and manage a website of the organization to provide services (e.g., e-commerce service, etc.) to clients or users of the organization. Processor 120 comprises one or more processors operably coupled to network interface 122, and memory 130. The processor 120 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 120 may be a programmable logic device, a microcontroller, a microprocessor, or any suitable combination of the preceding. The processor 120 is communicatively coupled to and in signal communication with the network interface 122, and memory 130. The one or more processors are configured to process data and may be implemented in hardware or software. For example, the processor 120 may be 8-bit, 16-bit, 32-bit, 64-bit, or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 136) to implement technology stack generation engine 104, work project scenarios generation engine 106, simulation engine 108, deployment engine 110, and rerouting engine 112. In this way, processor 120 may be a special purpose computer designed to implement the functions disclosed herein. In an embodiment, the processor 120 is implemented using logic units, FPGAs, ASICs, DSPs, or any other suitable hardware. The technology stack generation engine 104, work project scenarios generation engine 106, simulation engine 108, deployment engine 110, and rerouting engine 112 are configured to operate as described in FIGS. 1-3. For example, the technology stack generation engine 104, work project scenarios generation engine 106, simulation engine 108, deployment engine 110, and rerouting engine 112 may be configured to perform the steps of method 200 as described in FIG. 2, respectively.

Network interface 122 is configured to enable wired and/or wireless communications (e.g., to other computing devices). The network interface 122 is configured to communicate data between the computing device 102 and other computing devices, systems, or domain(s). For example, the network interface 122 may comprise a WIFI interface, a local area network (LAN) interface, a wide area network (WAN) interface, a modem, a switch, or a router. The processor 120 is configured to send and receive data using the network interface 122. The network interface 122 may be configured to use any suitable type of communication protocol as would be appreciated by one of ordinary skill in the art.

The memory 130 may be volatile or non-volatile and may comprise a read-only memory (ROM), random-access memory (RAM), ternary content-addressable memory (TCAM), dynamic random-access memory (DRAM), and static random-access memory (SRAM). In one embodiment, memory 130 comprises one or more disks, tape drives, solid-state drives, and/or the like. The memory 130 is operable to store work projects 132, characteristics 134 of the work projects 132, software instructions 136, performance threshold value 138, technology stack components 140, heuristics 142, policy definitions 144, simulation results 146, and/or any other data or instructions. The work projects 132, characteristics 134 of the work projects 132, software instructions 136, performance threshold value 138, technology stack components 140, heuristics 142, policy definitions 144, and simulation results 146 may comprise any suitable set of instructions, logic, rules, or code operable to execute the technology stack generation engine 104, work project scenarios generation engine 106, simulation engine 108, deployment engine 110, and rerouting engine 112. The store work projects 132, characteristics 134 of the work projects 132, software instructions 136, performance threshold value 138, technology stack components 140, heuristics 142, policy definitions 144, and simulation results 146 are described in FIGS. 1-5, in more detail.

Technology Stack Generation Engine

Technology stack generation engine 104 may be implemented using software instructions 136 executed by the processor 120, and is configured to generate technology stacks 114 by combining different technology stack components 140. The technology stack components 140 may include or be provided with a list of application servers 140-1 (e.g., Apache Tomcat, etc.) and webservers 140-2 (e.g., Sun java system webserver, etc.). Typically, a middleware stack or a technology stack 114 is a combination of software products (Tomcat, Apache http, etc.) written in different programming languages (e.g., hypertext markup language (html), JavaScript, etc.) used in the development of the software application 116.

Software application 116 is generally any software or web application developed using a technology stack 114 to perform specific tasks and interact with users via an interface. For example, the software application 116 may be a web application on a website of an organization with username and password fields interface. In this example, the software application 116 is programmed to enable each user of the organization to log in to his/her accounts when the user types his/her username and password in their corresponding fields of the interface of the software application 116. In another example, the software application 116 may be a web application on a website of an organization that is programmed to enable each user of the organization to view and/or download his/her reports when the user clicks on a button on the interface of the software application 116.

The technology stack generation engine 104 may combine different technology stack components 140 such that they are compatible with each other and can support the work project 132. For example, technology stack generation engine 104 may determine whether technology stack components 140 are compatible and can support the work project 132 from projects they were used in, from technology stack components 140 information on the web, and/or given by a user. In some examples, an application server 140-1 and a webserver 140-2 written in the same programming language are compatible to be combined. In another example, an application server 140-1 and a webserver 140-2 written with compatible programming languages, such as Java and HTML server, Python and HTML server, etc. are compatible to be combined. For example, the technology stack generation engine 104 may combine Tomcat application server 140-1 (written in Java programming language) with Apache webserver 140-2 (written in general-purpose HTTP server programming language); or Tomcat application server 140-1 with Microsoft internet information services (IIS) webserver 140-2 (written in general-purpose HTTP server programming language); etc. Details of operations of the technology stacks 114, application servers 140-1, and webservers 140-2 and some examples of the work project 132 are described in conjunction with the operational flow illustrated in FIG. 2.

Work Project Scenarios Generation Engine

Work project scenarios generation engine 106 may be implemented using software instructions 128 executed by the processor 120, and is configured to generate work projects 132 with different scenarios.

The work project 132 is typically referred to as a processing task given to the software application 116 associated with an organization to perform in a given time. The work project 132 may depend on a service that the organization provides to its users. For example, for an e-commerce organization providing an online platform to its users to buy and sell goods, the work project 132 may include a quality of service (QoS) of the website of the organization so that the users be able to navigate seamlessly through the website and find their desired item to buy in a short amount of time (e.g., by using recommendations systems such as recommending to the user the most purchased item similar to his/her desired item, etc.). In another example, the work project 132 may be the process of users of an organization to successfully login into their account. In another example, the work project 132 may be the process of users of an organization to successfully download their reports. In another example, the work project 132 may be the process of users of an organization to successfully view their reports.

In one embodiment, the work project scenarios generation engine 106 generates different work projects 132 scenarios by varying a set of variables (or load conditions) of the work project 132. For example, the set of variables of the work project 132 may include a number of users of the work project 132, an action performed by the users (e.g., logging into an account. viewing reports, downloading reports, etc.), a frequency of performing an action of the work project 132 by the users (e.g., once every second, etc.), a time period the work project 132 to be performed (e.g., in 10 minutes, etc.), the time of day that the work project 132 to be performed (e.g., performed in the morning, evening, etc.), the day of the week that the work project 132 to be performed (e.g., on weekday, weekend, holiday, etc.), the calendar date that the work project 132 to be performed (e.g., 01.01.2020), the actions of the work project 132, etc. For example, the function to generate different work project 132 scenarios may have a handle, such as:

generate work_project_scenarios (
input=work_project01,
no of users=[1000:1000:10000], //varying number of users from 1000 up to 10,000 with 1000 steps, (i.e., 1000, 2000, 3000, . . . , 10,000)
day=[mon, tues, wed, thu, fri, sat, sun],
time=[8 am: 8:10 am],
action1=download_report01, //each client downloads his/ her latest report . . . )

Simulation Engine

Simulation engine 108 may be implemented using software instructions 128 executed by the processor 120, and is configured to simulate the technology stacks 114 generated from the technology stack generation engine 104 performing the work project 132. In some embodiments, the simulation engine 108 may simulate the technology stacks 114 performing the work projects 132 in different scenarios generated by the work project scenarios generation engine 106.

Once the simulation process has completed, based on simulation results 146 the simulation engine 108 determines performance values 148 of each technology stack 114, which corresponds to a success rate of performing the work project 132 by the software application 116. For example, consider that the technology stack generation engine 104 has generated the first technology stack 114-1 and the second technology stack 114-2. Also, consider that the work project scenarios generation engine 106 has generated a work project scenario 132-1 in which 100,000 clients are logging into their accounts on the website of the organization and viewing their latest report in a period of 10 minutes. In this particular example, the simulation engine 108 runs the work project scenario 132-1 on each of the first technology stack 114-1 and the second technology stack 114-2 and determines their performance values 148. The simulation results 146 in this particular example may be:

TABLE 1

Example simulation results 146.

| Technology stack 114 | Work project 132 scenario | Performance value 148 |
|---|---|---|
| Technology stack 114-1 | First scenario 132-1 | 90% 148-1a |
| Technology stack 114-2 | First scenario 132-1 | 80% 148-1b |

TABLE 1 described here is illustrative only and is not meant to limit the scope of the invention or its embodiments. As illustrated in TABLE 1, the simulation engine 108 determines that a performance value 148-1a of the first technology stack 114-1 performing the work project scenario 132-1 is 90%, which means 90% of 100,000 clients (90,000 clients) were able to successfully login into their accounts on the organization website and view their latest report in 10 minutes. The simulation engine 108 also determines that a performance value 148-1b for the second technology stack 114-2 performing the work project scenario 132-1 is 80%, which means 80% of 100,000 clients (80,000 clients) were able to successfully login into their accounts on the organization website and view their latest report in 10 minutes. Thus, based on these simulation results 146, the simulation engine 108 determines that the first technology stack 114-1 has the highest performance value 148 among the simulated technology stacks 114. Other examples of operations of the simulation engine 108 is described in conjunction with the operational flow illustrated in FIG. 2.

Deployment Engine

Deployment engine 110 may be implemented using software instructions 136 executed by the processor 120, and is configured to select a technology stack 114 from among the simulated technology stacks 114 which has the higher performance values 148 and above a performance threshold value 138, and deploy it in the software application 116.

In a case where none of the simulated technology stacks 114 have a performance value 148 that is higher than the performance threshold value 138, the technology stack generation engine 104 may be triggered to adapt or calibrate the simulated technology stacks 114 changing one or more technology stack components 140 used in the simulated technology stacks 114. Then, the simulation engine 108 may rerun the work project 132 on the new set of technology stacks 114 until at least one of simulated technology stacks 114 have a performance value 148 higher than the performance threshold value 138. More details about the operations of the deployment engine 110 selecting a technology stack 114 is described in conjunction with the operational flow illustrated in FIG. 2.

Rerouting Engine

Rerouting engine 112 may be implemented using software instructions 136 executed by the processor 120, and is configured to monitor a deployed technology stack 114-1. The rerouting engine 112 stores the performance value 148 of the deployed technology stack 114-1 performing work project 132 scenarios in heuristics 142.

In some embodiments, if the performance value 148 of the deployed technology stack 114-1 is no longer the highest among the simulated technology stacks 114 and/or no longer higher than the performance threshold value 138 (stored in the heuristics 142), the rerouting engine 112 may calibrate the deployed technology stack 114-1 by replacing at least one technology stack component 140 (i.e., application servers 140-1 and/or webservers 140-2) in the deployed technology stack 114-1 until its performance value 148 again becomes the highest among the simulated technology stacks 114 and higher than the performance threshold value 138.

In some embodiments, if the performance value 148 of the deployed technology stack 114-1 is no longer the highest among the simulated technology stacks 114 and/or no longer higher than the performance threshold value 138 (stored in the heuristics 142), the rerouting engine 112 may reroute the currently deployed technology stack 114-1 and deploy another simulated technology stack 114 which now has the highest performance value 148 and its performance value 148 is higher than the performance threshold value 138.

The rerouting engine 112 operates based on the recorded operations of the deployed technology stack 114-1 and other simulated technology stacks 114 stored in the heuristics 142 and rules and guidelines stored in policy definitions 144. More details of the operations of the rerouting engine 112 are described in conjunction with the operational flow illustrated in FIG. 2.

In operation, the computing device 102 receives a request from the user (e.g., via a user interface) to generate and determine a technology stack 114 that is able to perform the work project 132 with a performance value 148 that is the highest among other technology stacks 114 and higher than the performance threshold value 138 (e.g., 85%) set by the user. The processor 120 may evaluate the work project 132 based at least in part upon a set of characteristics 134 of the work project 132 that are used to indicate requirements needed to perform the work project 132 by the software application 116 in the computing device 102. The set of characteristics 134 may include a software application 116 performance, an application server 140-1 performance, a webserver 140-2 performance, etc. The characteristics 134 may include a set of requirements and capabilities of the computing device 102, technology stack 114, and software application 116 to perform the work project 132. The technology stack generation engine 104 generates the technology stacks 114 by implementing different combinations of technology stack components 140 (i.e., the application servers 140-1 and webservers 140-2). The work project scenarios generation engine 106 generates different work project 132 scenarios in order to test the generated technology stacks 114 to perform the work project 132 with different scenarios. Then, the simulation engine 108 simulates the technology stacks 114 performing the work project 132. In some embodiments, the simulation engine 108 may simulate the technology stacks 114 performing the work projects 132 in different scenarios generated by the work project scenarios generation engine 106. Based on the simulation results 146, the simulation engine 108 determines a performance value 148 of each technology stack 114, corresponding to their success rate in performing the work project 132. The simulation engine 108, then, identifies a first technology stack 114-1 that has the highest performance value 147 from among the simulated technology stacks 114 and above the performance threshold value 138. The deployment engine 110 deploys the first technology stack 114-1 in the software application 116 to perform the work project 132.

Figure 2:
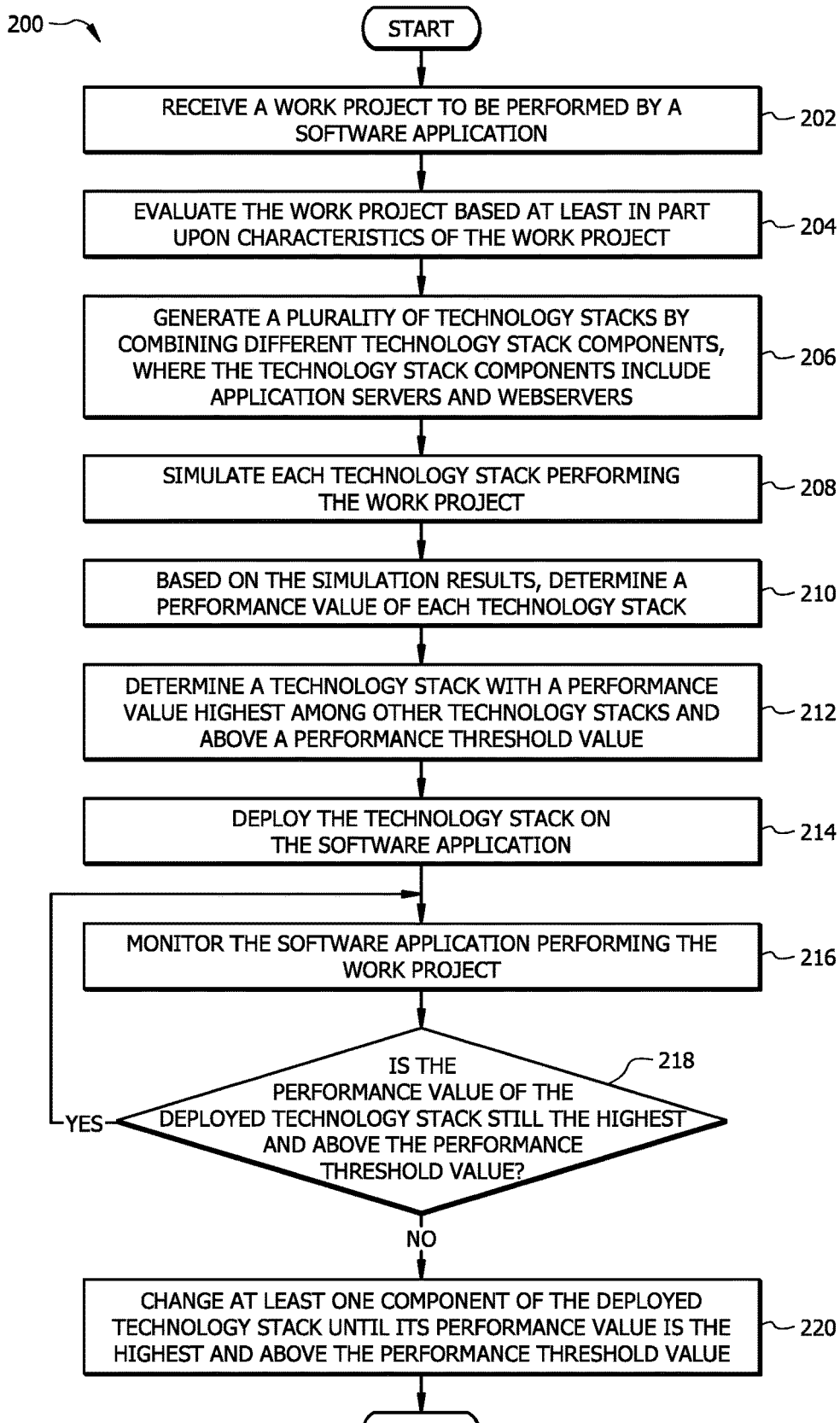
FIG. 2 illustrates an example of a flow chart of a method for determining a technology stack to be deployed on a software application.

FIG. 2 illustrates a flow chart of a method 200 for determining a technology stack 114 to perform a work project 132. One or more of steps 202-220 of the method 200 may be implemented, at least in part, in the form of software instructions 136 stored on non-transitory, tangible, machine-readable media (e.g., memory 130) that when run by one or more processors (e.g., processor 120) may cause the one or more processors to perform steps 202-220. In some embodiments, method 200 may be performed on system 100 including computing device 102, technology stack generation engine 104, work project scenarios generation engine 106, simulation engine 108, deployment engine 110, and rerouting engine 112. Aspects of the steps 202-220 of the method 200 have been covered in the description for FIG. 1; and additional aspects are provided below.

The method 200 begins at step 202 where the computing device 102 receives a request from the user (e.g., via a user interface) to generate and determine a technology stack 114 that is able to perform the work project 132 with a performance value 148 that is the highest among technology stacks 114 and higher than the performance threshold value 138.

The work project 132 may be user-intensive (e.g., includes a large number of users). For example, in the organization which provides e-commerce services to its clients by the software application 116 on its website, the work project 132 may be providing 100,000 clients to login to their accounts in a given period (e.g., 10 minutes). The work project 132 may be processing intensive (e.g., requires a large amount of processing capabilities). For example, in an organization which provides e-commerce services to its clients by the software application 116 on its website, the work project 132 may be providing 10,000 clients to transfer a large amount of payments to another client's account in a given period (e.g., 10 minutes). The work project 132 may be reporting intensive (e.g., requires fast and reliable access to account information e.g., reports for each user), etc. For example, in the organization which provides e-commerce services to its clients by the software application 116 on its website, the work project 132 may be providing 10,000 clients to view and/or download their latest report in a given period (e.g., 10 minutes). The work project 132 may be any combination of the examples mentioned above. For example, the work project 132 may be providing a large number of clients (e.g., 100,000) to login to their account, viewing, and/or downloading their latest report in a given period (e.g., 10 minutes).

In step 204, the processor 120 evaluates the work project 132 based on its characteristics 134, the computing device 102, and software application 116 in order to determine the requirements and capabilities needed by a technology stack 114 to be able to perform the work project 132 successfully. For example, depending on the work project 132 (e.g., whether the work project 132 is user-intensive, processing-intensive, reporting-intensive, etc.), the characteristics 134, the computing device 102, and software application 116, a technology stack 114 that would be able to perform the work project 132 may require different processing capabilities (e.g., speed, etc.), different memory capabilities (e.g., storage size, etc.), different application servers 140-1 technologies (e.g., Oracle Weblogic, IBM Websphere, Apache Tomcat, etc.), different webserver 140-2 technologies (e.g., Microsoft IIS, Apache, Sun java system webserver, etc.), etc. In this step, the work project scenarios generation engine 106 generates different scenarios of the work project 132 as described in FIG. 1.

The characteristics 134 may include performance indicators that specify the processing capabilities of the computing device 102 and performance requirements from the software application 116 needed to perform the work project 132. In some examples, the characteristics 134 may include processor capabilities of the computing device 102, such as CPU utilization, CPU usage, CPU bus size, CPU cache memory, size, number of cores of the CPU, etc. In some examples, the characteristics 134 may include memory capabilities of the computing device 102, such as available storage, total storage, memory bus size, memory speed, address space of the CPU that are currently resident in physical memory (i.e. working sets), an amount of memory that the CPU executable has asked for to perform the work project 132 (i.e., private bytes), etc. In some examples, the characteristics 134 may include disk usage of the computing device 102, such as an average disk queue length, an average disk read queue length, an average disk write queue length, an average disk read per second, an average disk transfer per second, a disk reads per second, disk writes per second, etc. In some examples, the characteristics 132 may include network capabilities of the computing device 102, such as network latency, network round trip (amount of time it takes for the software application 116 to send a request and receive a reply from a server to perform the work project 132). In some examples, the characteristics 134 may include performance capabilities and requirements of the software application 116, such as a number of users successfully accessed and connected to the software application 116, hits per second (i.e., a number of times the work project 132 has been sent to a server to process per second), errors per second (e.g., amount of times users were unable to access or connect to the software application 116), throughput per second (i.e., a number of requests that are successfully executed/serviced), user satisfaction score (e.g., an average satisfaction scores taken from users via a survey), availability (e.g., a time duration that the software application 116 has remained accessible to users), etc. In some examples, the characteristics 134 may include webservers 140-2 performance capabilities and requirements, such as response time for opening a web page (i.e., a time it takes to perform an "HTTP get" request on the webpage, e g., when a user tries to open a webpage of the organization to access his/her account), a page load time (i.e., a time it takes for a webpage to load in its entirety), a garbage collection (e.g., an automatic memory management in which the memory occupied by objects that no longer are in use by the software application 116 is reclaimed), etc.

In step 206, the technology stack generation engine 104 generates the technology stacks 114 by combining an application server 140-1 and a webserver 140-2 from the technology stack components 140 as described in FIG. 1.

One of the building blocks of the technology stacks 114 is application servers 140-1. The application servers 140-1 may include or be provided with a software code used to develop the software application 116 and to run the developed software application 116. Another building block of the technology stacks 114 is webservers 140-2. The webservers 140-2 may include or be provided with a software code and/or hardware configured to run the software application 116 to perform the work project 132 on the world wide web. The webservers 140-2 may include several parts that control how the users access files hosted on the hardware side of the webservers 140-2. The primary function of the webservers 140-2 may be to store, process, and deliver web pages to the users. The webservers 140-2 includes a software code (e.g., HTTP server) that understands web addresses and HTTP protocols (i.e., the protocols a typical browser uses to view webpages). This software code can be accessed through domain names of websites (e.g., bankofamerica.com). The webservers 140-2 may also include one or more servers that store the software side of the webservers 140-2 and the website component files of the webserver 140-2 (e.g. HTML documents, images, cascading style sheets (CSS), JavaScript files, etc.). The hardware side of the webservers 140-2 is connected to the internet and supports data transfer with other devices connected to the internet.

Whenever a user needs a file that is hosted on the hardware side of a webserver 140-2, the user requests the file via HTTP on a browser. When the request reaches the correct hardware side of the webserver 140-2, the software side of the webserver 140-2 accepts the user's request, finds the requested file (if it doesn't then a 404 response is returned), and sends it back to the user. For example, for the organization that provides e-commerce services to its users, when a user wishes to view and/or download his/her report, the user may request to view and/or download his/her report via software application 116 on the website of the organization. The webserver 140-2 of the software application 116 sends the user's request to a server that stores the report of the user, finds the report, and send it back to software application 116 to be viewed and/or downloaded.

In step 208, the simulation engine 108 simulates the generated technology stacks 114 performing the work project 132. In some embodiments, the simulation engine 108 may simulate the technology stacks 114 performing the work projects 132 in different scenarios generated by the work project scenarios generation engine 106. In this process, the simulation process may take as long as the duration of the work project 132. For example, if the work project 132 is to have 10,000 users access their accounts on the software application 116 of the organization and download their report in 10 minutes, the simulation process for this particular example may take 10 minutes.

In step 210, the simulation engine 108 determines a performance value 148 of each simulated technology stack 114 and generates the simulation results 146. For example, consider that the technology stack generation engine 104 has generated the first technology stack 114-1 and the second technology stack 114-2. Also, consider that the work project scenarios generation engine 106 has generated a first work project scenario 132-1 in which 100,000 clients are logging into their accounts on the website of the organization and viewing their latest report in 10 minutes, and a second work project scenario 132-2 in which 100,000 clients are logging into their accounts and viewing their latest report in 60 minutes.

Once the simulation process is completed, the simulation engine 108 determines a performance value 148-1a of the first technology stack 114-1 performing the first work project scenario 132-1 and a performance value 148-2a of the first technology stack 114-1 performing the second work project scenario 132-2. The simulation engine 108 also determines a performance value 148-1b of the second technology stack 114-2 performing the first work project scenario 132-1 and a performance value 148-2b of the second technology stack 114-2 performing the second work project scenario 132-2. In this particular example, the simulation results 146 may be represented by TABLE 2 illustrated below:

TABLE 2

Example simulation results 146.

| Technology stack 114 | Work project 132 scenario | Performance value 148 |
|---|---|---|
| Technology stack 114-1 | First scenario 132-1 | 85% 148-1a |
| | Second scenario 132-2 | 90% 148-2a |
| Technology stack 114-2 | First scenario 132-1 | 80% 148-1b |
| | Second scenario 132-2 | 83% 148-2b |

TABLE 2 described here is illustrative only and is not meant to limit the scope of the invention or its embodiments. As illustrated in TABLE 2, the performance value 148-1a of the first technology stack 114-1 is 85%, which means 85% of 100,000 clients (85,000 clients) were able to successfully login into their accounts on the organization website and view their latest report in 10 minutes. The performance value 148-2a of the first technology stack 114-1 is 90%, which means 90% of 100,000 clients (90,000 clients) were able to successfully login into their accounts on the organization website and view their latest report in 60 minutes. The performance value 148-1b of the second technology stack 114-2 is 80%, which means 80% of 100,000 clients (80,000 clients) were able to successfully login into their accounts on the organization website and view their latest report in 10 minutes. The performance value 148-2b of the second technology stack 114-2 is 83%, which means 83% of 100,000 clients (83,000 clients) were able to successfully login into their accounts on the organization website and view their latest report in 60 minutes. In this particular example, the simulation engine 108 determines that the first technology stack 114-1 has a higher performance value 148 among the simulated technology stacks 114.

In some embodiments, the performance value 148 may correspond to different characteristics 134. For example, performance value 148 may correspond to the average page load time (where a performance value 148 of a technology stack 114 may be based on how fast it can load the page in its entirety), the throughput (where a performance value 148 of a technology stack 114 may be based on the number of requests that are successfully executed/serviced), the user satisfaction score (where a performance value 148 of a technology stack 114 may be based on the satisfaction scores from the users), etc. as described in FIG. 1.

In step 212, the deployment engine 110 determines the technology stack 114 with a performance value 148 that is the highest among the simulated technology stacks 114 and above the performance threshold value 138. In an embodiment that the simulation engine 110 has simulated the technology stacks 114 performing the work project 132 with different scenarios, the deployment engine 110 may select a technology stack 114 with a performance value 148 that is the highest among the simulated technology stacks 114 and above the performance threshold value 138 when the technology stack 114 is performing different work project 132 scenarios compared to other simulated technology stacks 114 performing corresponding different work project 132 scenarios.

For example, in the TABLE 2, the deployment engine 110 compares the performance value 148-1a of the first technology stack 114-1 with the performance value 148-1b of the second technology stack 114-2; and compares the performance value 148-2a of the first technology stack 114-1 with the performance value 148-2b of the second technology stack 114-2. For this particular example, assume that the performance threshold value 138 is 84% set by the user. In this particular example, the first technology stack 114-1 has the highest performance values 148-1a and 148-2a compared to performance values 148-1b and 148-2b of the second technology stack 114-2; and the performance values 148-1a and 148-2a are both above the performance threshold value 138. Also, the performance value 148-2b is lower than the performance threshold value 138. Thus, the deployment engine 110 selects the first technology stack 114-1 to be deployed on the software application 116.

In some embodiments, if none of the simulated technology stacks 114 have the highest performance values 148 in all different work project 132 scenarios and/or above the performance threshold value 138, the technology stack generation engine 104 may be triggered to generate other technology stacks 114 by changing at least one component from the simulated technology stacks 114 with a component from the technology stack components 140.

In some embodiments, the performance threshold value 138 may be set differently based on different work project 132 scenarios. For example, a user-intensive work project 132 scenario may be associated with a first performance threshold value 138 that may be lower compared to a second performance threshold value 138 for a non-user-intensive work project 132 scenario. In another example, a third performance threshold value 138 for a processing-intensive work project 132 scenario may be different compared to a fourth performance threshold value 138 for a reporting intensive work project 132 scenario.

In some embodiments, the simulation engine 108 may take the average of the performance values 148 of each simulated technology stack 114 performing the work project 132 scenarios and compare their average performance values 148 with each other and with the performance threshold value 138. In this approach, if the technology stack generation engine 104 is unable to generate a technology stack 114 with the highest performance value 148 compared to other technology stacks 114 and above the performance threshold value 138 (e.g., because the work project 132 has stringent characteristics 134), the simulation engine 108 may still be able to provide a technology stack 114 that is the best available option to be deployed on the software application 116.

In step 214, the deployment engine 110 deploys the selected technology stack 114-1 on the software application 116 to perform the work project 132 and/or any incoming scenarios that may occur as the users access the software application 116 in a real-time environment. Here, the selected technology stack 114-1 goes into production where the technology stack 114-1 is implemented in the development of the software application 116 and the users may access the software application 116 (e.g., from the website of the organization) to access their accounts, request services, view their reports, download their reports, etc. The deployment engine 110 may record the performance values 148 of the deployed technology stack 114-1, as it runs the incoming scenarios from the users and stores their performance values 148 associated with the incoming scenarios in heuristics 142.

The heuristics 142 may include or be provided with a repository in which all the incoming scenarios, their outcomes, and the performance values 148 of the deployed technology stack 114-1 are stored. For example, a first incoming scenario saved in the heuristics 142 may be that from 1 pm to 1:05 pm on 01.01.2020, 10,000 users attempted to login into their account and 500 users were not able to log in, thus, the performance value 148 of the deployed technology stack 114-1 for performing this incoming scenario is 95%. In another example, a second incoming scenario saved in the heuristics 142 may be that from 1:30 pm to 1:35 pm on 01.01.2020, the number of users increased to 15,000 attempting to login into their account and downloading their report and 1000 user were not able to download their report, leading to a performance value 148 of 93.3%. In some embodiments, the simulation engine 108 may also have the generated technology stacks 114 to perform the incoming scenarios (via an offline-simulation) in order to evaluate their performance values 148 simulating the incoming scenarios. In some embodiments, the simulation engine 108 may have the generated technology stacks 114 to run the incoming scenarios (via an offline-simulation) as they occur such that as the users access the software application 116 and/or the simulation engine 108 may have the generated technology stacks 114 to run the incoming scenarios in real-time. In some embodiments, the simulation engine 108 may have the generated technology stacks 114 to run the incoming scenarios (via an offline-simulation) after they are performed by the deployed technology stack 114-2 and stored in the heuristics 142. The simulation engine 108 may store the performance values 148 of the generated technology stacks 114 simulating each incoming scenario (offline) and their outcomes in the heuristics 142.

In step 216, the rerouting engine 112 monitors the software application 116 including the deployed technology stack 114-1 performing the work project 132 and any incoming scenarios from the users. The rerouting engine 112 also monitors the other generated technology stacks 114 performing the work project 132 and any incoming scenarios from the users.

In step, 218, the rerouting engine 112 determines whether the performance value 148 of the deployed technology stack 114-1 is still the highest among all generated technology stacks 114 and above the performance threshold value 138.

If the performance value 148 of the deployed technology stack 114-1 is still the highest among the simulated technology stacks 114 and above the performance threshold value 138, the method 200 returns to step 216 where the rerouting engine 112 keeps monitoring the software application 116 including the deployed technology stack 114-1 and other generated technology stacks 114 performing the work project 132 and any incoming scenarios from the users.

If, however, the performance value 148 of the deployed technology stack 114-1 is no longer the highest and/or below the performance threshold value 138, the method 200 proceeds to step 220.

In step 220, the rerouting engine 112 changes at least one of the components of the deployed technology stack 114-1 with another component from the available technology stack components 140 (or calibrates the deployed technology stack 114-1) until its performance value 148 become the highest among the simulated technology stacks 114 and above the performance threshold value 138. The deployment engine 110 determines whether to keep, calibrate, or change the deployed technology stack 114-1 based on the policy definitions 144. The policy definitions 144 are a set of rules and guidelines set by the user to configure the rerouting engine 112 what should be done in different situations. Examples of the policy definitions 144 are described in conjunction with different embodiments of the operational flow of the system 100 and method 200 illustrated in FIGS. 3-5.

Figure 3:
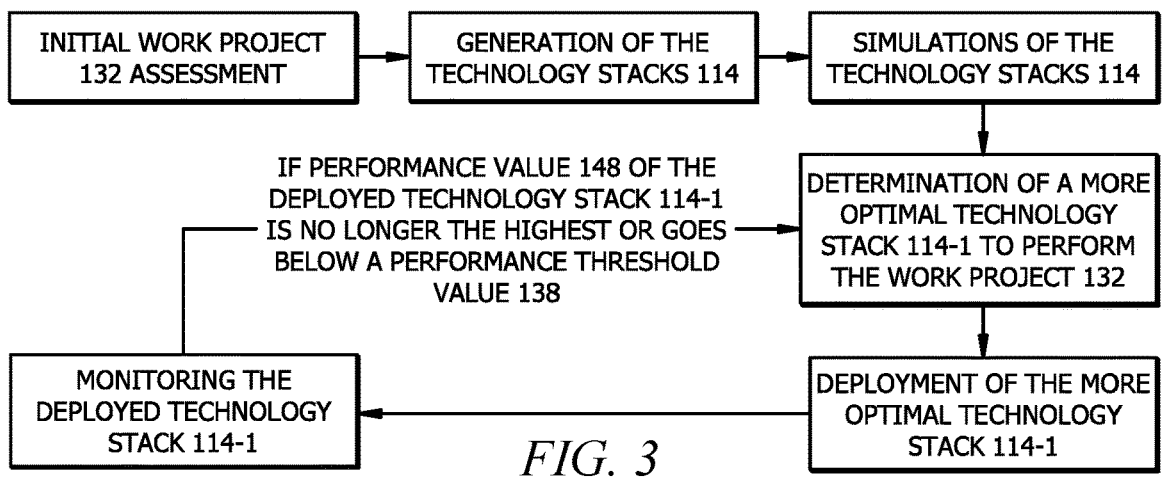
FIG. 3 illustrates a first embodiment of an operational flow of the system depicted in FIG. 1.

FIG. 3 illustrates a first embodiment of the operational flow of the system 100. In one embodiment, if the performance value 148 of the deployed technology stack 114-1 is no longer the highest and/or below the performance threshold value 138, based on the policy definitions 144, the rerouting engine 112 may facilitate calibrating the deployed technology stack 114-1 by changing at least one of its components (i.e., the application server 140-1a and/or the webserver 140-2a) with another component from the available technology stack components 140.

For example, if the performance value 148 of the deployed technology stack 114 becomes 5% lower than the second technology stack 114-2 (that used to have the second highest performance value 148) and/or goes below the performance threshold value 138 by 1%, the policy definitions 144 may include a guideline that the rerouting engine 112 to change at least one of the deployed technology stack 114 components (or calibrate it) until its performance value 148 increases at least by 5%. If, for example, after changing 10 technology stack components 140, the performance value 148 of the deployed technology stack 114 did not increase by 5%, change the deployed technology stack 114-1 (e.g., with the second technology stack 114-2).

In another example, if the performance value 148 of the deployed technology stack 114 becomes 10% lower than the second technology stack 114-2 (that used to have the second highest performance value 148) and/or goes below the performance threshold value 138 by 8%, the policy definitions 144 may include a guideline that the rerouting engine 112 to change at least one of the deployed technology stack 114 components (or calibrate it) until its performance value 148 increases at least by 10%. If, for example, after changing 10 technology stack components 140, the performance value 148 of the deployed technology stack 114 did not increase by 10%, change the deployed technology stack 114-1 (e.g., with the second technology stack 114-2).

In another example, if the performance value 148 of the deployed technology stack 114 becomes 10% lower than the second technology stack 114-2 (that used to have the second highest performance value 148) but still above the performance threshold value 138, the policy definitions 144 may include a guideline that it is not necessary to change the deployed technology stack 114.

Figure 4:
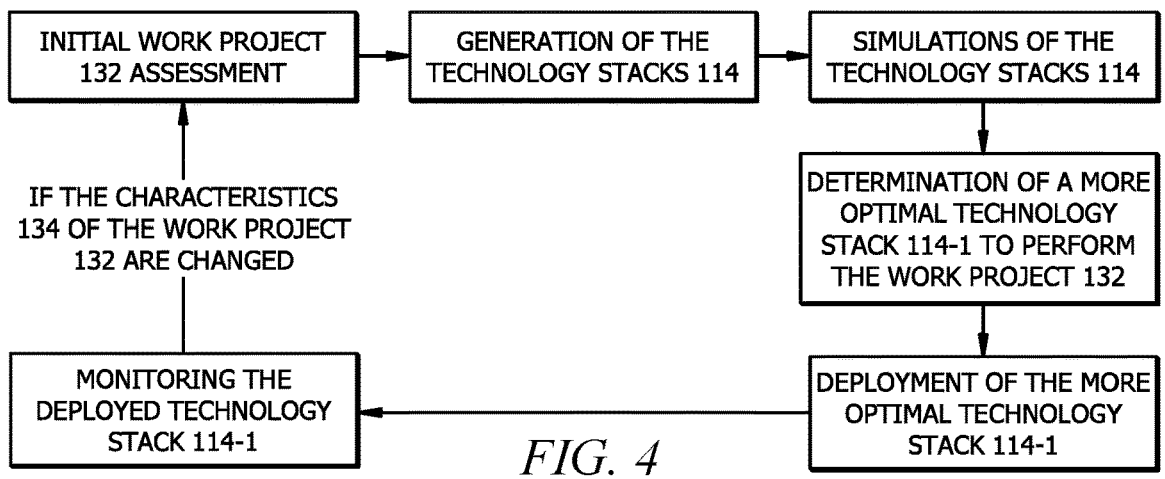
FIG. 4 illustrates a second embodiment of an operational flow of the system depicted in FIG. 1.

FIG. 4 illustrates a second embodiment of the operational flow of the system 100. In some embodiments where the work project 132 and/or characteristics 134 is changed and/or updated (e.g., if a new function is added to the work project 132, a new requirement is added to the characteristics 134, etc.), the deployment engine 110 may determine that the deployed technology stack 114 may need to be updated. Therefore, the method 200 may return to step 204 where the processor 120 assesses the new work project 132 with the new characteristics 134.

Figure 5:
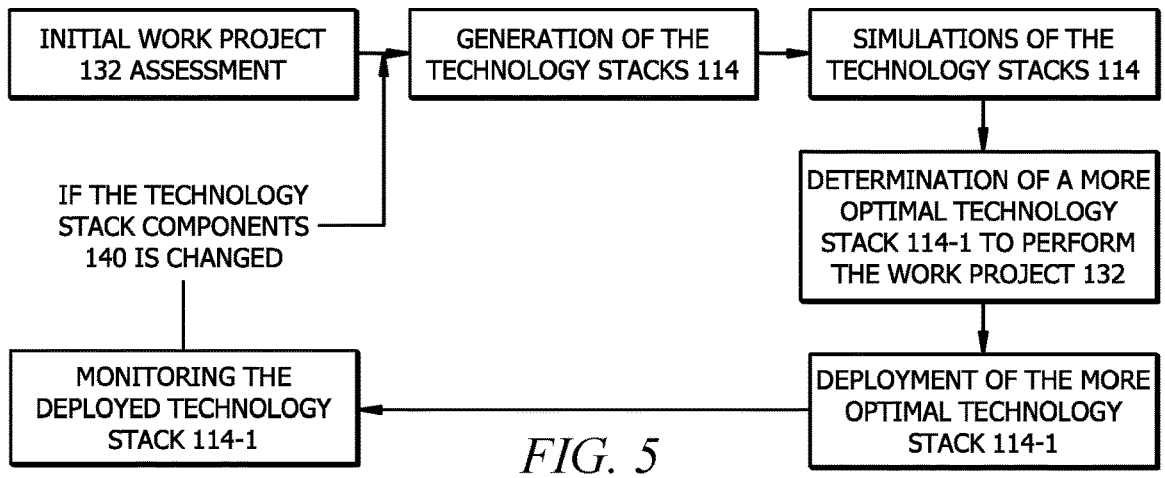
FIG. 5 illustrates a third embodiment of an operational flow of the system depicted in FIG.

FIG. 5 illustrates a third embodiment of the operational flow of the system 100. In some embodiments where the technology stack components 140 is changed and/or updated, such as when a new technology stack components 140 is added to the collection of the technology stack components 140 already present in the memory 130 (e.g., when a new application server 140-1 and/or a new webserver 140-2 becomes available in the market), the deployment engine 110 may determine that the deployed technology stack 114 may need to be updated. Therefore, the method 200 may return to step 206 where the technology stack generation engine 104 generates a new set of technology stacks 114 with the newly added technology stack components 140.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for determining a technology stack in a software application to perform a work project, the system comprising:
  a memory operable to store the work project; and
  a processor operably coupled to the memory, configured to:
    receive the work project;
    evaluate the work project based at least in part upon a set of characteristics of the work project, wherein the set of characteristics comprises a software application performance and a webserver performance;
    generate a plurality of technology stacks by implementing different combinations of technology stack components, wherein the technology stack components comprise application servers and webservers, wherein the plurality of technology stacks comprises a first technology stack comprising a first application server and a first webserver and a second technology stack comprising a second application server and a second webserver;
    simulate each technology stack performing the work project;
    based on simulation results of each technology stack, determine a performance value corresponding to a success rate of performing the work project by the software application;
    identify a first technology stack having a first performance value that is the highest performance value from among the plurality of technology stacks and above a performance threshold value set by a user; and
    deploy the first technology stack in the software application to perform the work project.

2. The system of claim 1, wherein the system is further configured to:
  determine heuristics of the first performance value of the deployed first technology stack based on a behavior of the deployed first technology stack performing the work project in a period of time set by the user;
  determine whether the first performance value of the deployed first technology stack is no longer the highest performance value or has gone below the performance threshold value based on the heuristics of the first performance value of the deployed first technology stack; and
  modify the deployed first technology stack in response to a determination that the first performance value of the deployed first technology stack is no longer the highest performance value or gone below the performance threshold value.

3. The system of claim 2, wherein modifying the deployed first technology stack comprises:
  identifying a first component from among the technology stack components; and
  replacing a component in the deployed first technology stack with the first component until the first performance value of the deployed first technology stack becomes the highest performance value from among the plurality of technology stacks and above the performance threshold value.

4. The system of claim 1, wherein the system is further configured to:
  determine whether the first performance value of the deployed first technology stack is no longer the highest performance value or has gone below the performance threshold value;
  in responses to a determination than the first performance value is no longer the highest performance value or has gone below the performance threshold value:
    identify a second technology stack having a second performance value with the highest performance value from among the plurality of technology stacks and above the performance threshold value; and deploy the second technology stack in the software application.

5. The system of claim 1, wherein the system is further configured to:
   determine whether one or more of the set of characteristics of the work project are changed;
   in response to a determination that one or more of the set of characteristics of the work project are changed:
      re-simulate each technology stack performing the work project with the changed set of characteristics;
      based on re-simulation results for each technology stack, determine a performance value corresponding to a success rate of performing the work project by the software application;
      identify a third technology stack having a third performance value that is the highest performance value from among the plurality of technology stacks and above the performance threshold value; and
      deploy the third technology stack in the software application.

6. The system of claim 1, wherein the system is further configured to:
   determine whether one or more components in the technology stack components are changed;
   in response to a determination that one or more components in the technology stack components are changed:
      generate a second plurality of technology stacks by implementing different combinations of the changed technology stack components;
      re-simulate each technology stack performing the work project;
      based on re-simulation results for each technology stack, determine a performance value corresponding to a success rate of performing the work project by the software application;
      identify a fourth technology stack having a fourth performance value that is the highest performance value from among the plurality of technology stacks and above the performance threshold value; and
      deploy the fourth technology stack in the software application.

7. The system of claim 1, wherein simulating each technology stack to perform the work project comprises:
   generating different scenarios of the work project by varying load conditions of the work project, wherein the load conditions of the work project comprise a number of users accessing the software application in a period of time and a period of time in which the work project is performed;
   performing the different scenarios of the work project on each technology stack; and
   comparing a performance value of each technology stack performing the different scenarios of the work project with each of the technology stacks performing corresponding different scenarios of the work project.

8. The system of claim 7, wherein identifying the first technology stack having the highest performance value comprises:
   determining that the first technology stack has a performance value that is the highest performance value from among the plurality of technology stacks and above than the performance threshold value when the first technology stack is performing the different scenarios of the work project compared to each of other technology stacks performing corresponding different scenarios of the work project.

9. A method for determining a technology stack in a software application to perform a work project, the method comprising:
   receiving the work project;
   evaluating the work project based at least in part upon a set of characteristics of the work project, wherein the set of characteristics comprises a software application performance and a web server performance;
   generating a plurality of technology stacks by implementing different combinations of technology stack components, wherein the technology stack components comprise application servers and web servers, wherein the plurality of technology stacks comprises a first technology stack comprising a first application server and a first webserver and a second technology stack comprising a second application server and a second webserver;
   simulating each technology stack performing the work project;
   based on simulation results of each technology stack, determining a performance value corresponding to a success rate of performing the work project by the software application;
   identifying a first technology stack having a first performance value that is the highest performance value from among the plurality of technology stacks and above a performance threshold value set by a user; and
   deploying the first technology stack in the software application to perform the work project.

10. The method of claim 9, wherein the method further comprises:
    determining heuristics of the first performance value of the deployed first technology stack based on a behavior of the deployed first technology stack performing the work project in a period of time set by the user;
    determining whether the first performance value of the deployed first technology stack is no longer the highest performance value or has gone below the performance threshold value based on the heuristics of the first performance value of the deployed first technology stack; and
    modifying the deployed first technology stack in response to a determination that the first performance value of the deployed first technology stack is no longer the highest performance value or gone below the performance threshold value.

11. The method of claim 10, wherein modifying the deployed first technology stack comprises:
    identifying a first component from among the technology stack components; and
    replacing a component in the deployed first technology stack with the first component until the first performance value of the deployed first technology stack becomes the highest performance value from among the plurality of technology stacks and above the performance threshold value.

12. The method of claim 9, wherein the method further comprises:
    determining whether the first performance value of the deployed first technology stack is no longer the highest performance value or has gone below the performance threshold value;
    in response to a determination than the first performance value is no longer the highest performance value or has gone below the performance threshold value:
       identifying a second technology stack having a second performance value with the highest performance value from among the plurality of technology stacks and above the performance threshold value; and deploying the second technology stack in the software application.

13. The method of claim 9, wherein the method further comprises:

determining whether one or more of the set of characteristics of the work project are changed;

in response to a determination that one or more of the set of characteristics of the work project are changed:

re-simulating each technology stack performing the work project with the changed set of characteristics;

based on re-simulation results for each technology stack, determining a performance value corresponding to a success rate of performing the work project by the software application;

identifying a third technology stack having a third performance value that is the highest performance value from among the plurality of technology stacks and above the performance threshold value; and deploying the third technology stack in the software application.

14. The method of claim 9, wherein the method further comprises:

determining whether one or more components in the technology stack components are changed;

in response to a determination that one or more components in the technology stack components are changed:

generating a second plurality of technology stacks by implementing different combinations of the changed technology stack components;

re-simulating each technology stack performing the work project;

based on re-simulation results for each technology stack, determining a performance value corresponding to a success rate of performing the work project by the software application;

identifying a fourth technology stack having a fourth performance value that is the highest performance value from among the plurality of technology stacks and above the performance threshold value; and deploying the fourth technology stack in the software application.

15. The method of claim 9, wherein simulating each technology stack to perform the work project comprises:

generating different scenarios of the work project by varying load conditions of the work project, wherein the load conditions of the work project comprise a number of users accessing the software application in a period of time and a period of time in which the work project is performed;

performing the different scenarios of the work project on each technology stack; and comparing a performance value of each technology stack performing the different scenarios of the work project with each of other technology stacks performing corresponding different scenarios of the work project.

16. The method of claim 15, wherein identifying the first technology stack having the highest performance value comprises:

determining that the first technology stack has a performance value that is the highest performance value from among the plurality of technology stacks and above than the performance threshold value when the first technology stack is performing the different scenarios of the work project compared to each of other technology stacks performing corresponding different scenarios of the work project.

17. A computer program comprising executable instructions stored in a non-transitory computer-readable medium that when executed by a processor causes the processor to:

receive a work project;

evaluate the work project based at least in part upon a set of characteristics of the work project, wherein the set of characteristics comprises a software application performance and a web server performance;

generate a plurality of technology stacks by implementing different combinations of technology stack components, wherein the technology stack components comprise application servers and web servers, wherein the plurality of technology stacks comprises a first technology stack comprising a first application server and a first webserver and a second technology stack comprising a second application server and a second webserver;

simulate each technology stack performing the work project;

based on simulation results of each technology stack, determine a performance value corresponding to a success rate of performing the work project by the software application;

identify a first technology stack having a first performance value that is the highest performance value from among the plurality of technology stacks and above a performance threshold value set by a user; and deploy the first technology stack in the software application to perform the work project.

18. The computer program of claim 17, wherein the processor is further configured to:

determine heuristics of the first performance value of the deployed first technology stack based on a behavior of the deployed first technology stack performing the work project in a period of time set by the user;

determine whether the first performance value of the deployed first technology stack is no longer the highest performance value or has gone below the performance threshold value based on the heuristics of the first performance value of the deployed first technology stack; and modify the deployed first technology stack in response to a determination that the first performance value of the deployed first technology stack is no longer the highest performance value or gone below the performance threshold value.

19. The computer program of claim 18, wherein modifying the deployed first technology stack comprises:

identifying a first component from among the technology stack components; and replacing a component in the deployed first technology stack with the first component until the first performance value of the deployed first technology stack becomes the highest performance value from among the plurality of technology stacks and above the performance threshold value.

20. The computer program of claim 17, wherein the processor is further configured to:

determine whether the first performance value of the deployed first technology stack is no longer the highest performance value or has gone below the performance threshold value;

in responses to a determination than the first performance value is no longer the highest performance value or has gone below the performance threshold value:
    identify a second technology stack having a second performance value with the highest performance value from among the plurality of technology stacks and above the performance threshold value; and
    deploy the second technology stack in the software application.

* * * * *